US012658659B2

(12) United States Patent
Deslandes et al.

(10) Patent No.: US 12,658,659 B2
(45) Date of Patent: Jun. 16, 2026

(54) DURATION-TUNABLE HIGH-ENERGY PICOSECOND PULSED OPTICAL FIBRE LASER SYSTEM AND USE OF SUCH LASER SYSTEM

(71) Applicant: ILASIS LASER, Pessac (FR)

(72) Inventors: Pierre Deslandes, Gradignan (FR); François Salin, Gradignan (FR); Florent Deloison, Bordeaux (FR)

(73) Assignee: HELIX SURGICAL, Pessac (FR)

( * ) Notice: Subject to any disclaimer, the term of this patent is extended or adjusted under 35 U.S.C. 154(b) by 547 days.

(21) Appl. No.: 18/259,069

(22) PCT Filed: Dec. 20, 2021

(86) PCT No.: PCT/EP2021/086833
§ 371 (c)(1),
(2) Date: Jun. 22, 2023

(87) PCT Pub. No.: WO2022/136290
PCT Pub. Date: Jun. 30, 2022

(65) Prior Publication Data
US 2024/0055817 A1 Feb. 15, 2024

(30) Foreign Application Priority Data

Dec. 23, 2020 (FR) ...................................... 2014061

(51) Int. Cl.
*H01S 3/00* (2006.01)
*H01S 3/067* (2006.01)
*H01S 3/102* (2006.01)

(52) U.S. Cl.
CPC ........ *H01S 3/0057* (2013.01); *H01S 3/06725* (2013.01); *H01S 3/1024* (2013.01)

(58) Field of Classification Search
CPC .. H01S 3/0057; H01S 3/06725; H01S 3/1024; H01S 3/06708; H01S 3/06754
See application file for complete search history.

(56) References Cited

U.S. PATENT DOCUMENTS

| 7,929,203 B2 * | 4/2011 | Harter ................... H01S 5/5045 359/341.5 |
| 8,948,219 B2 | 2/2015 | Nodop et al. |
| (Continued) | | |

FOREIGN PATENT DOCUMENTS

| EP | 1712936 A2 | 10/2006 |
| FR | 2939974 A1 | 6/2010 |

OTHER PUBLICATIONS

International Search Report w/English translation for PCT/EP2021/086833 mailed Mar. 31, 2022, 5 pages.

(Continued)

*Primary Examiner* — Xinning(Tom) Niu
(74) *Attorney, Agent, or Firm* — NIXON & VANDERHYE

(57) ABSTRACT

Disclosed is an optical-fibre laser system including an injector generating a source pulse, a spectro-temporal shaping module, at least one final optical-fibre amplifier having a length less than ten metres, the final amplifier being suitable for receiving a filtered pulse from a spectral filter and generating an amplified pulse with controlled chirp, a volume compressor which has a predetermined linear chirp and is suitable for receiving the amplified pulse and forming a compressed pulse having a duration of less than 3 picoseconds and an electronic unit for adjusting the duration of the compressed pulse, the electronic duration adjusting unit being formed by adjusting the energy of the source pulse and/or the amplified pulse, the duration of the compressed pulse being tunable according to the energy setting.

20 Claims, 8 Drawing Sheets

(56)　　　　　References Cited

U.S. PATENT DOCUMENTS

| | | | |
|---|---|---|---|
| 9,553,421 B2 | 1/2017 | Fermann | |
| 2005/0041702 A1* | 2/2005 | Fermann | B23K 26/0622 |
| | | | 372/25 |
| 2006/0120418 A1 | 6/2006 | Harter et al. | |
| 2007/0047965 A1* | 3/2007 | Liu | H04B 10/299 |
| | | | 398/147 |
| 2012/0062984 A1* | 3/2012 | Tong | H01S 3/0057 |
| | | | 359/337.2 |
| 2015/0085885 A1* | 3/2015 | Gu | H01S 3/094003 |
| | | | 372/18 |

OTHER PUBLICATIONS

Written Opinion of the ISA for PCT/EP2021/086833 mailed Mar. 31, 2022, 8 pages.

* cited by examiner

Fig.5B
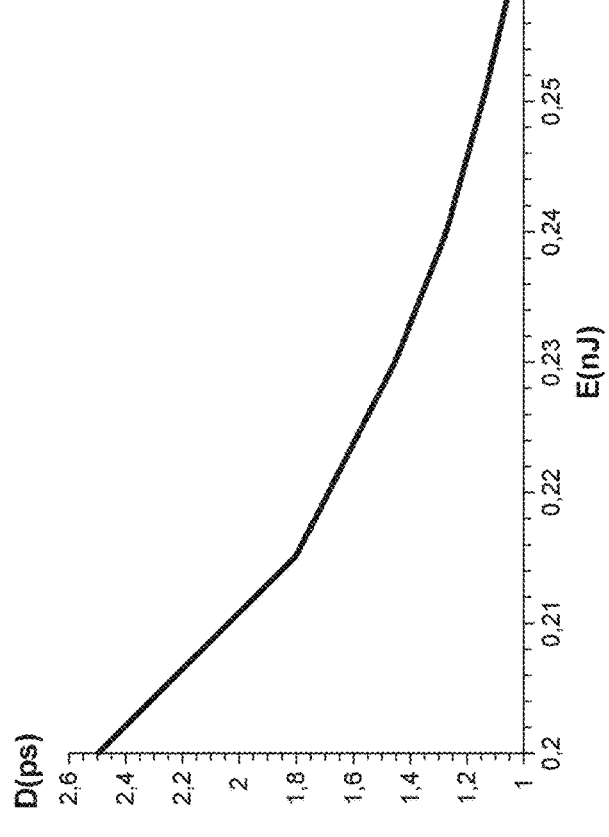
Fig.5A
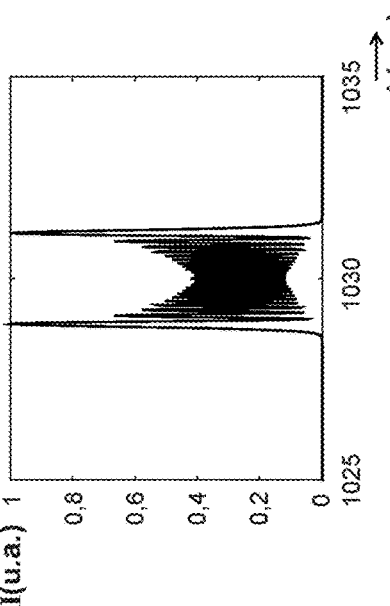
Fig.7
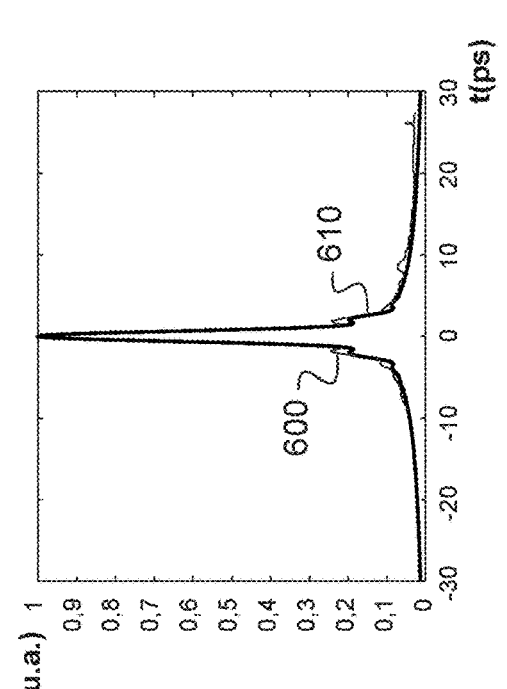
Fig.6

DURATION-TUNABLE HIGH-ENERGY PICOSECOND PULSED OPTICAL FIBRE LASER SYSTEM AND USE OF SUCH LASER SYSTEM

CROSS-REFERENCE TO RELATED APPLICATIONS

This application is the U.S. national phase of International Application No. PCT/EP2021/086833 filed Dec. 20, 2021, which designated the U.S. and claims priority to FR 2014061 filed Dec. 23, 2020, the entire contents of each of which are hereby incorporated by reference.

TECHNICAL FIELD

The present invention relates to the technical field of lasers for producing femtosecond (fs) or picosecond (ps) high-peak power laser pulses.

More precisely, the present invention relates to the field of optical-fibre lasers for delivering a laser pulse at the end of a wave-guide that is totally flexible in all directions, without deteriorating the quality of the laser beam.

PRIOR ART

Laser pulses of less than 10 ps duration are in demand for a wide variety of applications, such as micro-machining or eye surgery. It is known that the pulse duration is optimally less than 10 ps and a duration close to 1 ps is generally desirable. To be able to cause a material disruption by induced plasma (Laser induced breakdown), the peak power of the pulses must generally higher than 1 MW. One of the difficulties met is the ability to amplify ultra-short pulses (<10 ps) up to energies of more than 1 μJ or even 10 pJ. Moreover, it is desirable that the laser beam can be moved freely over a significant distance (longer than 1 m) and with a variable angle of incidence without modifying the geometric properties of the focal point. As a laser beam propagates exclusively in straight line in the air, it is generally necessary to use a set of mirrors, possibly movable in space, to direct the laser beam to the desired place with the desired angle of incidence.

A far more flexible solution has been found with the use of wave-guides and in particular optical fibres. The beam of a laser can then be forwarded to any place of the space and the direction thereof can be easily changed. This type of wave-guide is widely used in optical telecommunications and in power lasers used in industrial applications. There thus exist lasers with continuous radiation or producing long pulses, i.e. of more than 1 ns duration, using optical fibres to move the laser beam over a distance of several meters or even tens of meters. Those systems may be integrated on robot arms or in hand-pieces. The end through which the beam is emitted can then move along 6 axes.

When the duration of the pulses becomes lower than 1 ns or if the peak power typically exceeds 300 kW, the propagation over a few meters in a single-mode fibre gives rise to non-linear effects such as Raman effect and/or self phase-modulation that degrade the spatial and/or temporal properties of the laser pulse. In practice, it is currently impossible to propagate a laser pulse of 1 ps duration in a soft and flexible single-mode glass optical fibre with an energy higher than a few hundreds of nanojoules and over a distance longer than a few centimetres.

Likewise, direct amplification of ultra-short pulses, i.e. of typically less than 10 ps duration, faces with the appearance of non-linear effects that prevent the use of optical amplifiers thicker than a few millimetres. To amplify very short pulses, the chirped pulse amplification method is also known, which consists in transforming initially very short pulses (of generally less than 1 ps duration) by stretching them by a factor E up to several tens or even hundreds of picoseconds. Their peak power is then reduced by a same factor E allowing them to be amplified without undergoing the deleterious non-linear effects. These pulses are then recompressed by a dispersive system, called a compressor, generally composed of two diffraction gratings.

Chirped pulse amplification systems impose the use of an ultra-short pulse source, a pulse stretcher and a compressor that is very bulky and very sensitive to vibrations and moves. Their integration in an industrial system is complicated and requires the use of a set of mirrors to lead the beam to the piece to be worked. Moreover, it is advisable to finely set the stretching and compression factors, which imposes adjustable stretcher and/or compressor.

To compensate for this rigidity of use, fibre lasers have been developed. In these systems, the amplifiers are composed of ion-doped optical fibres allowing the amplification of a light wave.

In order to maintain the laser beam quality, the fibres used, whether they are passive or active, must be perfectly single-mode. It is also known that, despite the efforts of the optical fibre manufacturers, the current optical fibres having a core of more than typically 15 μm diameter are single-mode only if kept perfectly fixed. These fibres can be soft and be coiled according to various geometric shapes, but once the position has been chosen in order to produce a beam of good quality, any movement of the fibre causes a change in the geometric properties of the beam (shape, direction, power . . . ). These instabilities are particularly significant for short-length fibres, the propagation modes of higher orders not having the possibility to be filtered during the propagation in the fibre over a long length.

Soft-fibre lasers producing good-quality beams are thus limited to the use of fibres of less than 15 μm core diameter. This limitation applies both to active amplifying fibres and to passive amplifying fibres ensuring only the beam propagation. It thus appears that physics does not allow the production or propagation of laser pulses of less than 10 ps duration and of peak power of more than typically 100 kW over several metres in soft wave-guides making it possible to maintain the beam quality while moving the guide end in all the directions.

Different solutions have been proposed to construct a laser source allowing the transmission of ultra-short pulses over long distances using optical fibres.

Different authors have proposed to use hollow-core fibres to transport ultra-short laser pulses. These hollow-core fibres indeed avoid all the difficulties linked to the non-linear effects during the propagation in a solid medium, but they cannot amplify and they cannot be welded on conventional glass fibres.

Chirped pulse amplification has also been used to avoid the non-linear effects in the active or passive fibres, whether they are of the step-index or the photonic-structure type, by temporally stretching the pulses before their propagation. To obtain short pulses on the final target, these pulses have to be recompressed and a compressor has to be introduced after the fibre. However, to obtain high energies, a very high stretching factor (>500) must be used, which involves a very bulky compressor. Such a compressor is heavy and sensitive to vibrations or shocks. This method is thus not compatible with a smooth 3D movement of the beam.

The patent document EP 1 712 936 (Ramachandran et al) proposes to use multi-mode fibres whose core diameter is in particular greater than that of a single-mode fibre. The searched fundamental mode is converted into a high-order mode before being injected into the fibre. This system requires the use of a stretcher before injecting the pulse into the fibre and a mode converter to bring back the multi-mode beam to a usable shape close to that of a single-mode beam. Moreover, it is sensitive to mode coupling and thus to the movements of the fibre.

The patent document U.S. Pat. No. 8,948,219 proposes a solution using passively-triggered lasers associated with a non-linear optical amplifier and an adjustable compressor.

The patent document U.S. Pat. No. 9,553,421 discloses a laser based on a picosecond source followed with a pulse transformer, a fibre amplifier and a compressor. For the person skilled in the art, the source being totally fibred and all the components being welded together, the only setting is in the compressor that it configured to compress the pulses. That is thus the compressor that adapts itself to the system to compress the pulses. This is here also a conventional compressor, opto-mechanically adjustable and intrinsically sensitive to vibrations or chocks.

The purpose of the present invention is to propose a method for producing pulses of less than 10 picoseconds and preferably less than 3 picoseconds duration, of tunable duration and high energy, i.e more than 100 nJ, easily orientable and movable in all the directions without alteration of the beam spatial quality.

DISCLOSURE OF THE INVENTION

For that purpose, the present disclosure proposes an optical-fibre laser system comprising an injector suitable for generating at least one source pulse of duration between 30 and 100 picoseconds and having a source spectral bandwidth, a spectro-temporal shaping module arranged at the output of the injector, the spectro-temporal shaping module comprising a passive single-mode optical fibre having a length between 100 metres and 1 kilometre, the passive single-mode optical fibre having a physical length in metres that is between 6 and 12 times the duration of the source pulse in picoseconds, the spectro-temporal shaping module being configured to receive the source pulse and to generate a spectrally broadened pulse having a spectral bandwidth 5 to 50 times broader than the source spectral bandwidth and a duration of less than 1.5 times the source pulse duration, an optical amplifier system with flexible single-mode optical-fibre(s), the optical amplifier system having a flexible optical fibre length longer than one metre, the optical amplifier system comprising at least one last active optical fibre amplifier, the last amplifier having a length of less than ten metres, at least one last spectral filter arranged downstream from the spectro-temporal shaping module and upstream from the last optical fibre amplifier, the last spectral filter having a spectral bandwidth of less than 50 nm and higher than or equal to the spectral bandwidth of the spectrally broadened light pulse, in such a way as to limit the generation of a Raman signal in the last optical-fibre amplifier, the last amplifier being suitable for receiving a filtered pulse from the spectral filter and for generating a controlled chirped amplified pulse at one end of the last amplifier, the end of the last optical-fibre amplifier being flexible about at least two axes of rotation transverse to the optical axis, with a minimum bending radius of less than 50 cm, the amplified pulse having an energy of more than 1 microjoule, a volume compressor attached to the end of the last optical-fibre amplifier, the compressor having a predetermined and fixed linear or almost-linear chirp, the compressor being suitable for receiving the amplified pulse and forming a compressed pulse of less than 3 picoseconds duration, and electronic means for adjusting the compressed pulse duration, said electronic duration adjustment means being consisted of energy adjustment means suitable for adjusting the energy of the source pulse and/or of the amplified pulse, the compressed pulse duration being tunable based on the energy setting.

The laser system is entirely fibred between the injector and the compressor. Moreover, all the fibres used are single-mode optical fibres having a core diameter of less than 25 micrometres, and preferably less than 15 micrometres, or even less than 10 micrometres. The fibres are optical fibres of the step-index or the photonic-crystal-structure type, comprising a solid core surrounded by a cladding of hollow capillaries. The single-mode optical fibres may be oriented and bent with a minimum bending radius of less than 50 cm and more than 5 cm, while maintaining the laser beam quality and the single-mode aspect. In particular, the last optical-fibre amplifier is flexible about at least two axes of rotation transverse to the longitudinal optical axis at the end of the last optical-fibre amplifier. More precisely, the unit formed by the compressor and the end of the last active optical-fibre amplifier is flexible about at least two axes of rotation transverse to the longitudinal optical axis at the end of the last optical-fibre amplifier, with a minimum bending radius of less than 50 cm.

This optical-fibre laser system structure makes it possible to generate a compressed laser pulse of less than 10 picoseconds or even 3 picoseconds duration, of high energy and tunable duration. The end of the last optical-fibre amplifier attached to the compressor is easily orientable and movable in all the directions without alteration of the spatial quality of the pulse laser beam. Indeed, the compressor is non adjustable (it is pre-set at the factory), which allows keeping a reduced volume, while using a volume compressor suitable to resist to a high-energy pulse. Advantageously, the source pulse has an energy of more than 1 nanojoule.

Other non-limiting and advantageous features of the laser system according to the invention, taken individually or according to all the technically possible combinations, are the following:
    the injector further includes a pulse selector or an optical attenuator or an electro-optic modulator or an acousto-optic modulator or any combination of these elements and the energy adjustment means are suitable for adjusting the energy of the source pulse by means of the pulse selector, the optical attenuator, the electro-optic modulator or the acousto-optic modulator, respectively, or the combination thereof;
    the electronic means for adjusting the compressed pulse duration comprise means for adjusting the energy of the optical amplifier system;
    the optical amplifier system comprises at least one pump diode suitable for generating a pump radiation and the means for adjusting the energy of the optical amplifier system are suitable for adjusting an electrical current of the pump diode in such a way as to adjust the pump radiation injected into the optical amplifier system;
    the injector comprises a laser oscillator chosen among a gain-triggered laser diode, a solid laser, a phase-locked fibre laser, a passive mode-locked fibre laser and a semiconductor laser;
    the optical amplifier system is based on step-index optical fibre(s) and/or photonic-crystal-structure optical fibre (s) having a solid core and a guiding cladding formed of capillaries arranged in a ring around the core;

the optical amplifier system includes a double-cladding optical fibre;

the amplifier system includes a last passive single-mode optical fibre arranged upstream from the last flexible optical-fibre amplifier;

the last amplifier has a length of less than one metre or two metres;

the amplifier system includes a first flexible optical-fibre amplifier arranged upstream from the last amplifier and a first spectral filter arranged downstream from the spectro-temporal shaping module and upstream from the first amplifier;

the last amplifier and/or the first amplifier includes an optical fibre having a core based on silica doped with rare earth ions, chosen among the following ions: ytterbium, neodymium, erbium-ytterbium, holmium, thulium, ytterbium-thulium;

the compressor includes two fixed-pitch gratings or a dispersive volume Bragg grating with continuously variable pitch;

the system comprises a flexible protective mechanical cladding arranged around the last amplifier and the passive fibre and mechanically attached to the compressor;

the energy adjustment means are suitable for adjusting the energy of each source pulse individually in order to vary the compressed duration of each individually amplified pulse;

the compressed pulse duration decreases as a function of the increasing energy of the source pulse in a variation range of ±40% of the source pulse energy.

The invention also proposes the use of an optical-fibre laser system according to one of the embodiments in a micro-machining device, a medical device, an ophthalmic surgery device or a skin tattoo removal device.

Obviously, the different features, alternatives and embodiments of the invention can be associated with each other according to various combinations, insofar as they are not incompatible or exclusive with respect to each other.

BRIEF DESCRIPTION OF THE DRAWINGS

The following description in relation with the appended drawings, given by way of non-limiting examples, will allow a good understanding of what the invention consists of and of how it can be implemented.

In the appended drawings:

FIG. 2A schematically shows an injector of the laser system according to an exemplary embodiment;

FIG. 2B schematically shows an injector according to an alternative;

FIG. 5A illustrates a calculated example of spectral shape after the spectro-temporal shaping module of a pulse of 50 ps initial duration and 0.07 nm initial spectral width, the spectral width of the shaping module being of 0.29 nm;

FIG. 5B shows the calculated spectral shape of the same pulse at the output of the last optical amplifier in a system comprising a spectro-temporal shaping module, the initial spectral width being of 0.07 nm and the spectral width after amplification being of 2.43 nm;

FIG. 6 shows respectively the calculated autocorrelation trace corresponding to the conditions used for FIG. 5B (610), and the experimental autocorrelation trace (600) recorded for initial pulse and amplifier architecture parameters similar to those used for the figure (610);

FIG. 7 is an example of compressed pulse duration variation as a function of a source pulse energy variation;

It is to be noted that, in these figures, the structural and/or functional elements common to the different alternatives can have the same references numbers.

DETAILED DESCRIPTION

Figure 1:
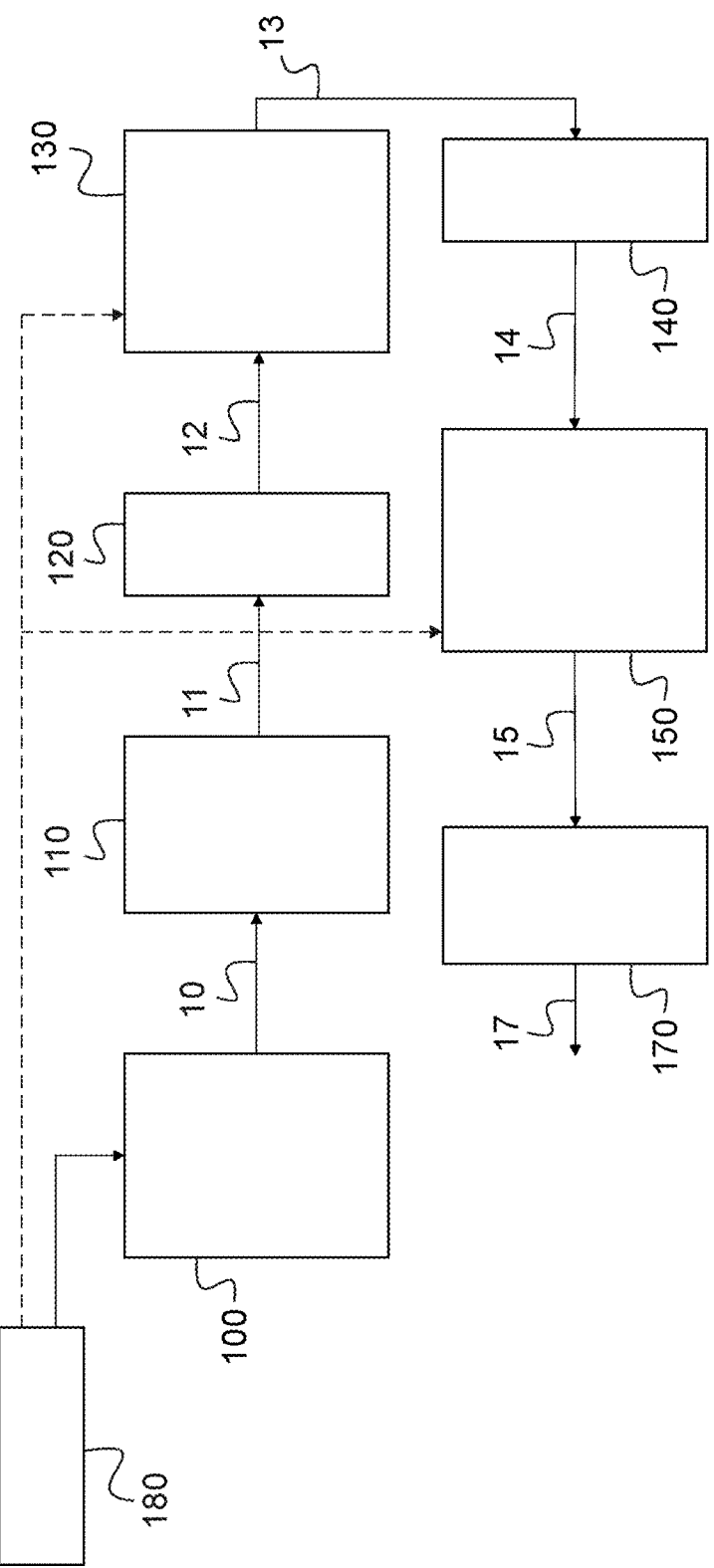
FIG. 1 schematically shows an optical-fibre laser system according to the present disclosure.

FIG. 1 schematically shows an optical-fibre laser system according to the present disclosure making it possible to generate a compressed pulse 17 of picosecond or femtosecond duration, high energy and adjustable in duration.

The structure and operation of each of these components as well as the characteristics of the pulses propagating in such a system will now be described.

More precisely, the laser system comprises an injector 100, a spectro-temporal shaping module 110, an optical amplification system associated with a spectral filtering device, a compressor 170 and energy adjustment means 180.

The injector 100 produces one or several source pulses 10. The spectro-temporal shaping module 110 receives a source pulse 10 and generates a spectrally broadened pulse 11. The optical amplification system combined with the spectral filtering device receives a spectrally broadened pulse 11 and forms an amplified pulse 14. The compressor 170 receives the amplified pulse 14 and generates a compressed pulse 17.

The injector 100 produces source pulses 10 of duration between 30 and 100 ps. The injector 100 comprises for example a laser oscillator.

The energy adjustment means 180 allow the energy of the source pulse 10 emitted by the injector 100 to be adjusted. The energy of the pulse injected into the optical amplifier system being adjustable, the energy of the amplified pulse is therefore indirectly adjustable. Consequently, the injector 100 combined with the energy adjustment means 180 makes it possible to generate a source pulse 10 of adjustable energy. The energy of the source pulse at the output of the injector is generally in a range between 0.1 nJ and 2 nJ. The duration of the source pulse is for example determined by the spectral width of the filter contained in the cavity of the laser oscillator. For a given injector, the duration of the source pulses 10 is thus generally constant as a function of time, from one pulse to the other. The duration of the source pulse, denoted $d_0$, is here between 30 ps and 100 ps. The energy adjustment of a source pulse 10 generally does not affect the duration thereof. The source pulse 10 is emitted in a spectral band $B_0$ around an emission wavelength, for example 1030 nm, the spectral band $B_0$ having a width between 0.03 nm and 0.3 nm.

The spectro-temporal shaping module 110 is arranged between the injector 100 and the optical amplification system. The spectro-temporal shaping module 110 is consisted of a passive single-mode fibre having a length between 100 m and 1000 m. This fibre is of the polarization-maintaining type and has a core with a diameter between 5 and 12 μm. Examples of fibres useful for this application are the PM980 (Nufern, USA or YOFC, China) or the HI1060 (Corning, USA). The spectro-temporal shaping module 110 receives a source pulse 10. The propagation of the source pulse in the passive optical fibre induces an effect of self-phase modulation of the pulse that depends on the light intensity of the source pulse and that produces a spectral broadening proportional to the peak power of the injected pulses and to the fibre length. During its propagation in the fibre, the pulse undergoes the combined effects of the group speed dispersion (index variation with the wavelength) and of the self-phase modulation (index variation of the instantaneous power). The spectral and temporal phase of the pulse is then modified and takes a shape that depends on the fibre and pulse parameters that are used. In particular, the chirp (derivative function of the phase with respect to the frequency) depends on these parameters. That way, the spectro-temporal shaping module 110 fulfils a phase adapter function upstream from the optical amplifier system.

In the system illustrated in FIG. 1, the energy adjustment means 180 make it possible to adjust the energy of the source pulse emitted by the injector 100 and thus to vary the chirp of the pulse from the spectro-temporal shaping module 110. In other words, the spectro-temporal shaping module 110 makes it possible to generate a spectrally broadened pulse 11, having a chirp controlled as a function of the source pulse energy. In other words, the spectral bandwidth of the spectrally broadened pulse 11 is adjustable as a function of the source pulse energy. The spectrally broadened pulse 11 has a spectral bandwidth that extends around the source wavelength and that is 5 to 50 times more extended than the spectral width B0 of the source pulse. The spectral bandwidth of the spectrally broadened pulse 11 is greater than 0.3 nm. This spectrally broadened pulse 11 is injected into the optical amplification system and into the associated spectral filtering device.

The optical amplification system is consisted of single-mode optical fibre(s). The optical amplification system comprises at least one last optical amplifier 150. As an alternative, the optical amplification system comprises at least one first optical amplifier 130 and the last optical amplifier 150 arranged in series. According to other alternatives (not illustrated), the optical amplification system includes more than two optical-fibre amplifiers arranged in series to form successive amplification stages.

Moreover, a section of passive optical fibre, of less than 10 m fibre length, may be inserted between two amplification stages. In particular, a single-mode passive optical fibre may be inserted upstream from the last optical-fibre amplifier 150 to allow lengthening the flexible optical fibre length.

Each optical-fibre amplifier is consisted of an active optical fibre. According to one embodiment, an active optical fibre is a double-cladding optical fibre having a core doped with rare earth ions, for example ytterbium ions. The double-cladding structure allows an optical pumping by injection of the radiation of one or several laser diodes into the first cladding, called the pump cladding. The active optical fibres are preferentially of the polarization-maintaining type. These fibres are well known by the person skilled in the art and are not described herein. They may be of the step-index or the photonic-crystal-structure type. The pump radiation guiding may be obtained by index step between the core and a solid cladding surrounding the core or by a very thin ring of capillaries (air clad) surrounding the core. The absorption of the pump radiation injected into the pump cladding is typically between 3 dB/m and 20 dB/m at the pump wavelength.

As an alternative, the energy adjustment means 180 further allow directly adjusting the energy of the amplified pulse at the optical amplifier system, for example by adjustment of the current of a pump diode for at least one optical-fibre amplifier of the amplification system. The amplifier is composed of at least one optical fibre, the energy adjustment of the amplified pulse induces a variation of the phase modulation when passing through this amplifier and all the fibres located downstream from this amplifier and therefore a modification of the compressed pulse duration.

A spectral filter 120, respectively 140, is arranged upstream from each optical amplifier 130, respectively 150. More precisely, the last spectral filter 140 is arranged upstream from the last optical amplifier 150. In an alternative comprising several amplifiers, a first spectral filter 120 is arranged upstream from the first optical amplifier 130, also called optical pre-amplifier. In other words, each optical amplifier is associated with a spectral filter arranged upstream. Generally, the spectral filter is adjacent to the optical amplifier with which it is associated. A spectral filter is composed for example of a glass plate supporting a multi-dielectric treatment whose transmission is maximum around the source pulse wavelength and very small out of this area. This filter is advantageously placed in a component comprising a fibre inlet followed with a free-space collimating lens, itself followed with the free-space filter, followed with a second lens for refocusing into an output fibre. A fibred Bragg grating or possibly a volume Bragg grating may also be used, placed in a free-space component. The last spectral filter 140, respectively the first spectral filter 120, is generally a band-pass filter. More precisely, the spectral filter 120, respectively 140, is chosen to transmit a spectral band of about 50 nm and less than 100 nm, centred on the wavelength of the source pulse, for example 1030 nm, while greatly attenuating the generation of a spurious Raman signal in each optical amplifier 130, respectively 150. This spectral band may be voluntarily reduced to 8 nm or even 4 nm around the central wavelength of the source pulse.

The spectral filter 120 receives a spectrally broadened pulse 11 with a chirp adjustable as a function of the source pulse energy and transmits a spectrally-filtered pulse 12 to the first optical amplifier 130. The first optical amplifier 130 amplifies the filtered pulse 12 and generates a pre-amplified pulse 13. The spectral filter 140 receive the pre-amplified pulse 13 and transmits a spectrally-filtered pulse 14 to the last optical amplifier 150. The first optical amplifier 150 amplifies the filtered pulse 14 and generates an amplified pulse 15.

The spectral filter 120, respectively 140, thus makes it possible to limit a power transfer towards a Raman line liable to appear in the optical fibre of the spectro-temporal shaping module or in the optical-fibre amplifiers 130, 150, by stimulated Raman effect, this Raman line being liable to increase as propagation and amplification go along. That way, the Raman radiation is greatly attenuated or even eliminated after each stage in order to avoid the progressive increase of the Raman radiation, while cumulating a spectral broadening by self-phase modulation during the different stages of propagation or amplification.

The spectral filter 120, respectively 140, makes it possible to accumulate the self-phase modulation by eliminating at each passage of a filter the power of the Raman line. The competition between self-phase modulation and generation of a Raman line being eliminated, it is thus possible to reach a spectral broadening of the amplified pulse 15 by self-phase modulation by a factor of more than 50, or even 100, with respect to the spectral width of the source 100 without being limited by the increase of the Raman effect.

The non-linear optical effects whose self-phase modulation and Raman effect are proportional to the product of the travelled length by the local light intensity. These non-linear optical effects are thus particularly significant in the final part of the amplifier system in which the pulse energy is maximum. The power produced by the amplifier(s) is liable to be limited by the appearance of Raman radiation. According to the present disclosure, on the one hand, the length of the active fibre of the last amplifier 150 is limited, and on the other hand, any passive optical fibre after the last amplifier 150 is eliminated. This arrangement makes it possible to limit the fibre length travelled by the amplified pulse. The flexible offset cannot be made using an amplifier housed in the main casing of the laser followed with a passive fibre section that would ensure the flexible transport of the pulses. In this case, the Raman effect induced by a pulse of maximum energy over lengths of the order of 2 to 3 m would be unacceptable. In an exemplary embodiment, the last fibre section comprises a section of passive optical fibre followed with the last optical amplifier 150 consisted by an active fibre section. The passive fibre and the active fibre have close or even identical core diameters, for example two fibres with a core of 10 μm diameter or a passive fibre of 10 μm and an active fibre of 12 μm or a passive fibre of 10 μm and an active fibre of 14 μm and both have a double-cladding structure. The active fibre of the last optical amplifier 150 has a core diameter between 9 μm and 20 μm, and advantageously between 10 μm and 15 μm. The active fibre of the last optical amplifier 150 has a length of less than 2 m and preferentially of less than 1 m. In an embodiment, for example for a last optical amplifier 150 having a length of 1 m, the passive fibre has a length of about 3 m. The active fibre of the last optical amplifier 150 has a core doped with ytterbium ions.

The passive fibre of the last section upstream from the last optical amplifier 150 makes it possible to increase the volume of laser-matter interaction in which the distal end of the last optical amplifier 150 may be moved, without changing the properties of the amplified laser pulse.

At the output of the last optical amplifier 150, the amplified pulse 15 has an energy higher than or equal to about 1 microjoule (μJ). Moreover, this energy is adjustable as a function of the source pulse energy. Complementarily, the energy of the amplified pulse 15 is moreover adjustable, for example when the energy adjustment means 180 allows adjusting the pump current of at least one optical amplifier.

The compressor 170 is arranged downstream from the optical amplification system. More precisely, the compressor is attached to the distal end of the last optical-fibre amplifier 150. By way of example, the active fibre of the last amplifier may be equipped with a connector of the FC-APC type or equivalent that is connected to the mechanical part supporting the compressor, or be fastened in a collimator that allows producing a collimated beam, said collimator being attached to the compressor support.

The compressor 170 is massive and non adjustable. In other words, the spectral phase-shift introduced by the compressor is fixed. The compressor 170 having a predetermined dispersion of about 5 to 30 ps/nm, it does not include adjustment means and has a reduced footprint. In a particular embodiment, the compressor has for typical size 5 mm×5 mm×7 mm and is included in a mechanical module that has for example a volume of 2 cm×2 cm×2 cm side. The compressor 170 allows a compression by a factor typically 20 to 50 for an initial pulse of 50 ps. The compressor being not adjustable, it is stable against external disturbances, for example vibrations. In an exemplary embodiment, the compressor 170 is composed of a fixed set of two diffraction gratings in series on the optical path according to the conventional compression scheme. According to a particularly advantageous alternative, the compressor 170 is composed of a Chirped Volume Bragg Grating (or CVBG, produced for example by the OPTIGRATE company, Florida, USA). More precisely, a chirped Bragg grating has a diffraction pitch chirped along its propagation axis. A chirped Bragg grating is known to be able to produce a spectral phase shift very close to a parabola and hence a quasi-linear chirp.

The compressor 170 receives the amplified pulse 15 at the output of the last amplifier 150 and forms a high-energy compressed pulse 17. The energy, respectively peak power, of the compressed pulse 17 is of the order of 1 μJ to 30 μJ, respectively 500 kW to 30 MW. The duration of the compressed pulse 17 is less than 10 ps, or even less than 3 ps, or even less than 1 ps, i.e. in the femtosecond domain. More precisely, the duration of the compressed pulse 17 is adjustable as a function of the source pulse energy.

The duration adjustment of the compressed pulse 17 is of crucial importance in certain applications, for example eye surgery, in particular cataract surgery. Here, an increase by about 20% to 25% of the source pulse energy makes it possible to vary the duration of the compressed pulse from 2 ps to 1 ps (see FIG. 6), without any other adjustment of the laser system (no phase or dispersion adjustment of the compressor, in particular). Now, a decrease of the pulse duration by a factor 2 corresponds to an increase of the peak power by a factor 2. The control of the source pulse energy and hence of the amplified pulse makes it possible to control very finely the peak power delivered at the output of the compressor. This control is here entirely and only operated via an electronic control system and requires no optical or opto-mechanical adjustment. Therefore, according to the present disclosure, the pulse duration adjustment may be performed more rapidly than with a mechanical or opto-mechanical system. This allows adjusting the duration of each pulse individually and hence optimizing the laser-matter interaction, for example.

Figures 2A, 2B:
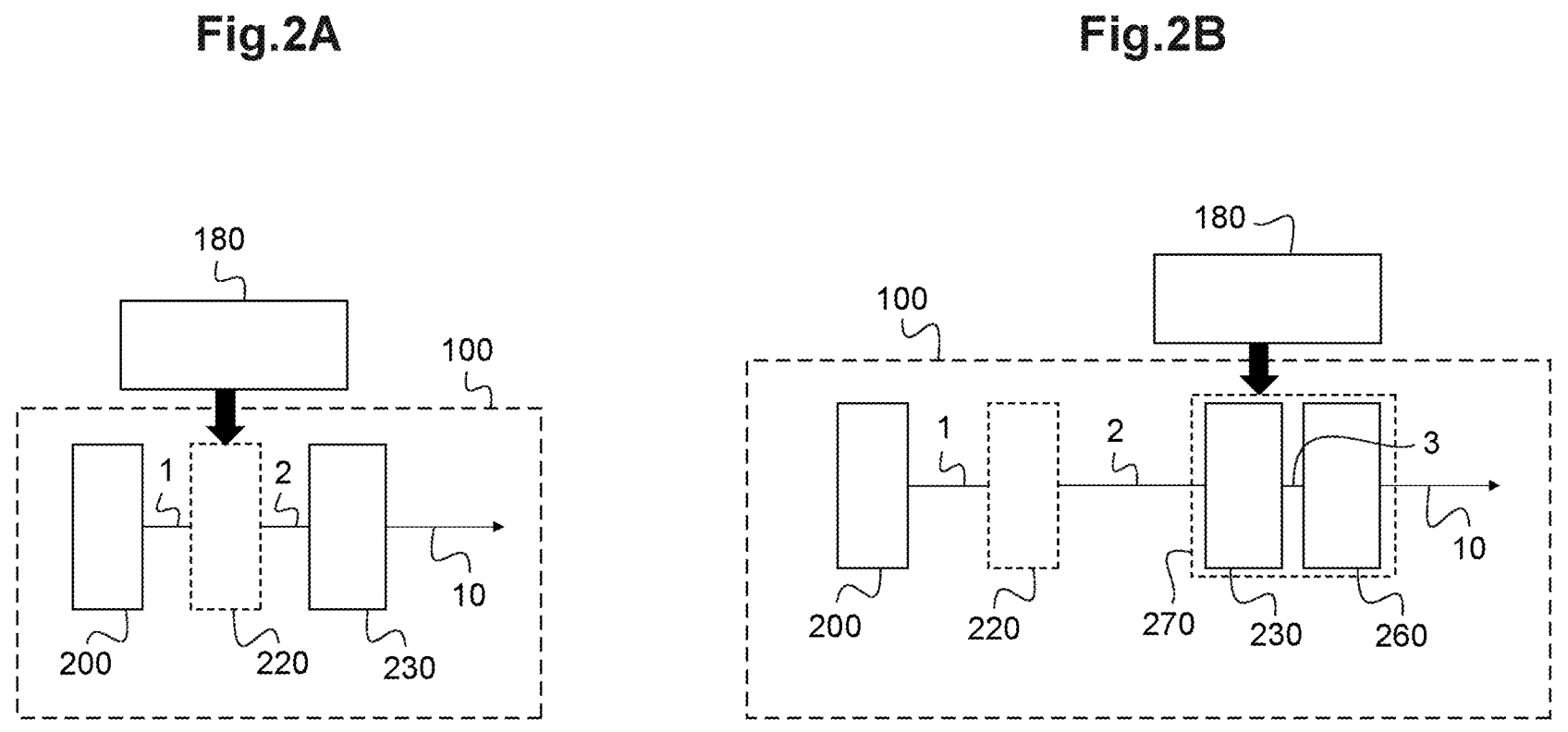

FIG. 2A represents a first exemplary embodiment of an injector in a laser system according to the present disclosure. The injector 100 here includes a laser oscillator 200, a source optical pre-amplifier 220 and a pulse selector 230. The laser oscillator 200 generates at least one initial pulse 1 of duration $d_0$ and spectral band $B_0$. The source optical pre-amplifier 220 allows increasing the intensity/energy of the initial pulse 1 and generating a pre-amplified initial pulse 2, without modifying its duration or its spectral band. More precisely, the energy adjustment means 180 allow the intensity/energy of the pre-amplified initial pulse 2 to be adjusted. The pulse selector 230 makes it possible to modify the laser source rate and to select one or more source pulses 10 called input pulse among the pre-amplified initial pulses 2. In an example, the laser oscillator 200 generates initial pulses 1 at a rate generally between 1 MHz and 100 MHz. The pulse selector 230 makes it possible to reduce the rate of the source pulses 10 or to select a source pulse 10 on demand. The pulse selector is for example an acousto-optic modulator or an electro-optic modulator. In addition to its role of source rate adjustment, it possibly allows modulating the energy of the pulses 10.

Therefore, by adjusting the energy of the source pulse 1 using energy adjustment means 180, it is possible to adjust the duration of the compressed pulse 17. The evolution of the compressed pulse 17 duration at the compressor 170 can be seen in FIG. 7.

In the case where the injector 100 includes a source optical pre-amplifier 220 and a pulse selector 230, the source optical pre-amplifier 220 may be arranged either upstream or downstream from the pulse selector 230.

If the energy of the initial pulse 1 from the oscillator is less than about 100 pJ, this source pulse 1 is injected into the source optical pre-amplifier 220 in order to bring the energy of the pre-amplified initial pulse 2 to a value of more than 100 mJ and preferentially a value of more than 1000 mJ or 1 nJ. The gain of the source optical pre-amplifier 220 is electronically adjustable using energy adjustment means 180, which allows adjusting the energy of the source pulse 10 at the output of the injector 100. The source optical pre-amplifier 220 takes the form of a doped fibre pumped by one or several laser diodes. Examples of doping materials for active optical fibres include ytterbium (Yb), neodymium (Nd), erbium (Er), erbium-ytterbium (Er/Yb) co-doping, holmium (Ho), thulium (Tm), Yb,Tm co-doping, without being limited to this list. The source optical pre-amplifier 220 is pumped by one or several laser diodes. The gain adjustment of the source optical pre-amplifier can thus be made by adjusting the parameters of the pump diode(s), as for example their power supply current.

The rate of the oscillator 200 is typically of 10 to 100 MHz but may be less than 10 MHz, or even less than 1 MHz, without being lower than the final rate of production of the compressed pulses 17. If the rate of the oscillator 200 does not correspond to that which is desired for the compressed pulses 17 at the output of the system, the initial pulse 1 or, respectively, the pre-amplified initial pulse 2 is injected into a pulse selector 230 that reduces the rate and selects the source pulses 10 intended to be amplified. This pulse selector 230 is for example an acousto-optic modulator whose inputs and outputs are fibred. It may also take the form of an electro-optic modulator or any other element fast enough to select the pulses. The pulse selector 230 is optional if the oscillator 200 operates directly at the output rate desired for the system. This is usually the case for a triggered or modulated laser diode oscillator.

In another embodiment, illustrated in FIG. 2B, the injector includes a laser oscillator 200, a source optical pre-amplifier 220, a pulse selector 230 and an optical attenuator 260. The energy of the source pulses 10 is finely adjusted thanks to a component that may take the form of an attenuator or a controllable modulator. The optical attenuator 260 may be a separate element or be included in a same optical modulator 270 as the pulse selector 230. An acousto-optic modulator makes it possible for example to select the pulses one by one and at the same time to adjust the energy of these pulses at the modulator output. That way, a train of initial pulses having an energy of the order of 1 nJ at a rate of 20 MHz may be transformed into a train of source pulses 10 at a rate of for example 250 kHz and an energy adjustable between 0.01 nJ and 0.5 nJ. The rate of the source pulses 10 may also be chosen independently among the sub-multiples of 20 MHz. The advantage of a fast modulator such as an acousto-optic or electro-optic modulator is that it makes it possible to modulate the energy of the source pulses 10 one by one and to produce trains of pulses of adjustable energy for each source pulse 10.

The injector 100 is piloted by a control unit 180 that makes it possible to modulate the energy of each source pulse 10 independently from each other. The energy of the source 10 is modulated, which will result in a slight modification of energy of the amplified 15 and compressed 17 pulses but above all in a modification of their compressed duration. The injector 100 is then capable of producing a train of source pulses 10 at a maximum rate that is the rate, denoted F0, of the laser oscillator 200 but that may be any sub-multiple rate (F0/n) of this initial rate, n being an integer, each source pulse 10 having an adjustable energy. The injector 100 may also produce packets of N source pulses 10 at the rate F0 or at a lower rate F0/n, these packets being generated in a periodic or no-periodic way. Generally, the injector 100 produces a train of source pulses 10 at the rate desired by the user and whose energy is adjustable.

Figure 3:
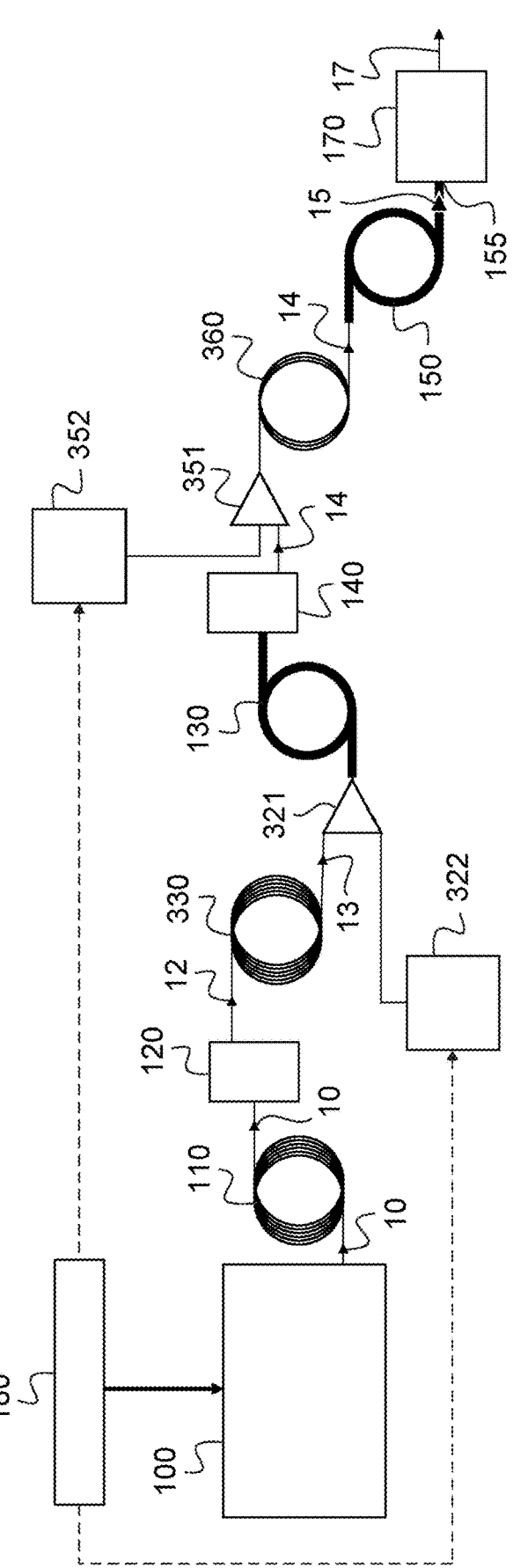
FIG. 3 schematically shows an optical-fibre laser system according to a first exemplary embodiment.

FIG. 3 schematically shows an optical-fibre laser system according to a first exemplary embodiment. The optical-fibre laser system includes an injector 100 as described in connection with FIG. 2A or 2B, an optical-fibre spectro-temporal shaping module 110, a series of doped-fibre optical amplifiers 130, 150 and a compressor 170. This optical-fibre laser system allows the production of high-energy ultra-short pulses 17. The series of doped-fibre optical amplifiers 130, 150 allows increasing the pulse energy by a factor 1000, or even 10,000 or 100,000 or 1,000,000, or more. Examples of doping materials for optical fibres include Yb, Nd, Er, Er/Yb, Ho, Tm, Yb/Tm ions, without being limited to that list. The compressor 170 allows compressing the duration of the amplified pulses 15 by a factor greater than 10.

In order to reduce the duration of the compressed pulses 17 at the output of the optical-fibre laser system, the present disclosure uses the self-phase modulation and a spectro-temporal shaping module 110. The self-phase modulation phenomenon creates a spectral broadening accompanied by a phase modulation. To obtain a maximum compression of the amplified pulse, it is necessary that the chirp associated with the phase modulation created in all the elements located inside the injector 100 and the compressor 170, including the optical amplifiers 130, 150, correspond precisely to the chirp induced in the compressor 170, sign included. The positive chirp due to the self-phase modulation is compensated for by a negative chirp induced by the compressor. To solve this problem, the present disclosure uses a spectro-temporal shaping module 110 that makes it possible to adjust the chirp of the amplified pulse 15 at the input of the compressor 170. The spectro-temporal shaping module 110 is composed of a polarization-maintaining, passive single-mode optical fibre, whose length in metres is between 6 and 12 times the duration in picoseconds of the source pulse 10 incident on this fibre. As described in connection with FIGS. 2A and 2B, the energy of the source pulse 10 injected into the fibre 110 is adjusted thanks to the energy adjustment means 180. The core diameter of this fibre 110 is between 5 and 10 μm and generally between 5 and 7 μm. The spectrum of the spectrally broadened pulse 12 at the output of this fibre 110 is broadened by a factor between 5 and 30. A spectral broadening factor greater than 30 is harmful because liable to induce the appearance of stimulated Raman scattering that will deform the pulse.

The profile of the spectrally broadened pulse 12 is only a little modified during this propagation. Its duration remains lower than 1.5 times the duration of the source pulse 10 and the parabolic quality factor introduced by Pierrot is more than 0.13. The spectrally broadened pulse 12 is hence not considered as quasi-parabolic. Nevertheless, it may be shown using a code for simulating the propagation in the fibres that, when this spectro-temporal shaping module 110 is followed with a non-linear optical amplifier in which the pulse spectrum will again be broadened by a factor 3 to 20, the final chirp after amplification is linear over a significant part of the amplified pulse 15, which significantly improves the quality of the compressed pulses 17.

The beam of spectrally broadened pulse 12 from the spectro-temporal shaping module 110 is coupled in one or several components that ensure an isolation between the amplification stages and a spectral filtering of the wavelengths out of a spectral band close to that of the source 100. In particular, the filters 120, 140 have a very low transmission at the wavelength of the Raman frequency produced by the radiation from the source 100. This value is easily computable from the parameters known as the Raman shift of fused silica (450 cm$^{-1}$). For example, for a laser oscillator emitting at a wavelength of 1030 nm, the filter 120, 140 is chosen to have a transmission that is high around 1030 nm, for example between 1025 nm and 1035 nm, and very low around 1080 nm. An example of filter is a filter by transmission having a transmission of more than 90% over the band 1026-1034 nm and a transmission of less than 1% over the band 1050 nm-1150 nm.

After a passage in a first spectral filter 120 and an optical isolator (not shown), the spectrally broadened pulse 12 propagates in a passive fibre 330 that makes it possible to guide the pulse up to the input of the first active fibre amplifier 130. In a particular mode of use, the spectral filter 120 and the optical isolator are included in a same fibred component that provides both the filtering and isolation functions. The passive fibre 330 and the active fibre 130 have an identical or very close diameter, typically between 5 and 11 m. The active fibre of the first amplifier 130 has a length between 1 m and 5 m, and preferentially between 1 m and 2 m. The active fibre of the first amplifier 130 is pumped by one or several laser diodes 322. The pump radiation is injected into the pump cladding of the active fibre of the first amplifier 130 for example using a pump combiner 321. The gain of the first amplifier 130 is typically of 10 to 1000, and advantageously between 10 and 100.

A second unit including an optical isolator and a last spectral filter 140 is arranged at the output of the first amplifier 130. The last spectral filter 140 operates on the same principle as the first spectral filter 120. The spectrally broadened pulse 14 from this optical isolator and last spectral filter 140 unit is transmitted to a passive optical fibre 360 through another pump combiner 351. The pump combiner 351 allows injecting into the passive fibre 360 the pump radiation of one or several pump diodes 352. The passive 360 is for example a polarization-maintaining, double-cladding passive fibre whose core and cladding diameters are substantially identical to those of the active fibre of the last amplifier 150 to which it is welded.

The length of the passive fibre 360 is between 1 and 10 m and preferentially between 1 and 3 m in order to limit the non-linear effects in this fibre. The passive fibre 360 has a core having a core diameter of about 10 to 20 m. The active fibre of the last amplifier 150 is a double-cladding fibre whose core is doped by rare earth ions. In our example, the active fibre of the last amplifier 150 is an ytterbium-doped fibre whose core diameter is 12.5 μm. The absorption of the fibre for a pump injected into the cladding of typically 105 μm diameter is of the order of 8 dB/m at 976 nm. The gain of this active fibre 150 is between 100 and 3000 and preferentially between 300 and 1000. The energy of an amplified pulse 15 exiting from the last amplifier 150 exceeds 1 μJ and is preferentially between 10 μJ and 40 μJ. The energy per pulse is limited by the appearance of a Raman radiation linked to the very strong non-linear optical effects in the last amplifier 150. In order to limit these effects, it is advisable to limit as much as possible the length of active fibre of the last optical amplifier 150. A length of 0.7 m is a good example of optimization. The unit consisted by the passive fibre 360 and the active fibre 150 is advantageously protected by a soft metal or plastic cladding that covers in particular the weld between the fibres 360 and 150. This cladding is soft and makes it possible to position the end of the active fibre of the last amplifier 150 in all the directions and all the positions on a volume of at least 2 m diameter.

The radiation of the amplified pulse 15 from the last active-fibre amplifier 150 is incident on the compressor 170 whose chirp is fixed and non-adjustable. An example of compressor of this type is sold by OPTIGRATE (Oviedo, USA) under the reference CBG-1030-XX. The dispersion of this compressor is typically between 7 and 50 ps/nm and preferentially of less than 30 ps/nm. The compressor 170 is suitable for supporting the transmission of compressed pulses 17 of less than 3 ps duration, with energies of more than 1 μJ. These operating parameters are incompatible with a fibred dispersive Bragg grating compressor. The compressor 170 is fixedly attached to the active fibre of the last amplifier 150. The compressor 170 has dimensions that are compatible with the easy movement in all the directions and positions of the end of the fibre to which it is attached. For example, its volume is less than 50×50×50 mm and in our example less than 25×25×25 mm. The beam diameter in the compressor 170 is chosen to allow a damage-free propagation in the components of the system of the intended application that will receive the laser source, i.e. for example 3 mm. A greater or smaller diameter is of course possible without impairing the performance of the present invention.

Figure 4:
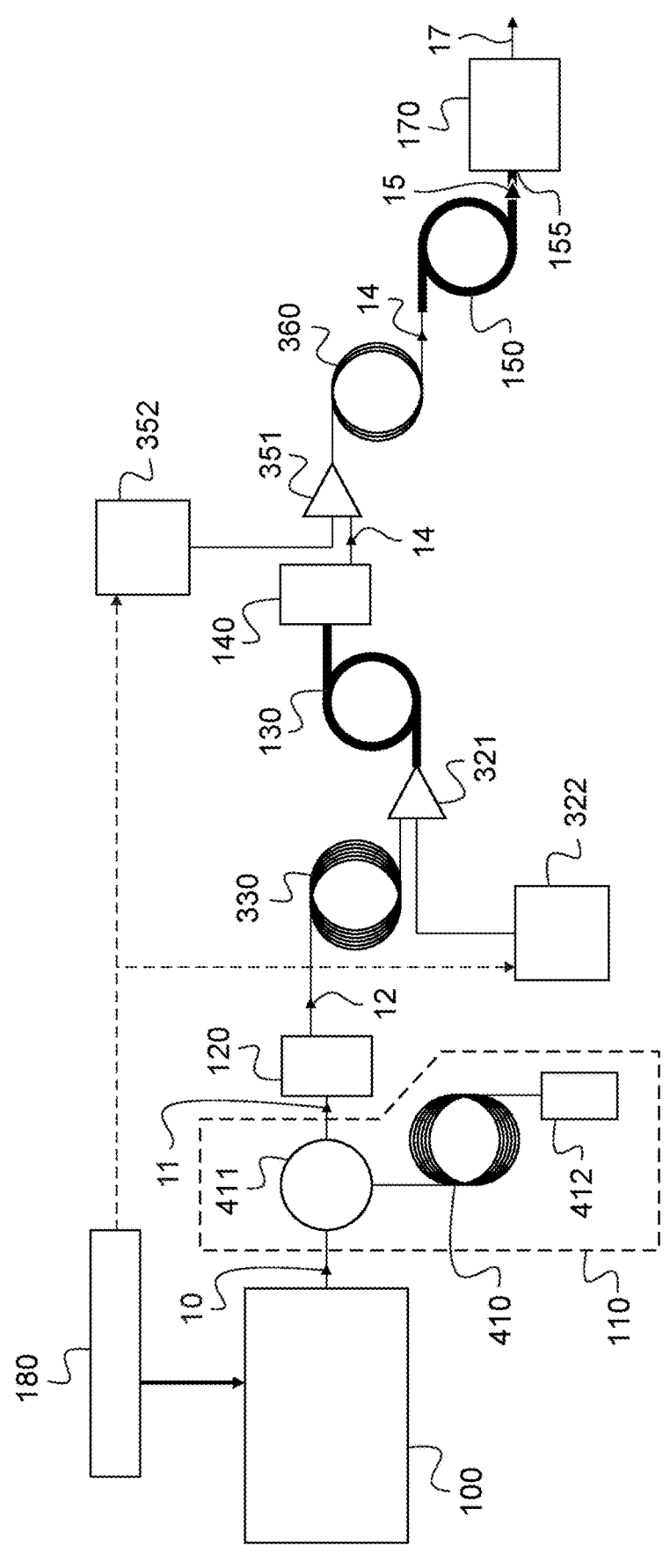
FIG. 4 schematically shows an optical-fibre laser system according to an alternative to the first exemplary embodiment.

FIG. 4 illustrates an interesting alternative of the optical-fibre laser system of FIG. 3. According to this alternative, the spectro-temporal shaping module 110 is used in reflection. The output of the injector 100 is coupled in an optical circulator 411 well known by the person skilled in the art. The optical circulator 411 directs the source pulse 10 towards a passive optical fibre 410 of half the length of the passive fibre of the source pulse 110 described in connection with FIG. 3. In practice, the passive optical fibre 410 is a polarization-maintaining, single-mode fibre, whose length in metres is between 3 and 5 times the duration in picoseconds of the pulse incident on this fibre. A fibred Bragg mirror 412 of spectral width between 0.1 and 3 nm, centred to the wavelength of the source pulse, is welded at the end of this passive optical fibre 410. The fibred Bragg mirror 412 reflects the laser pulse for a second passage in the passive optical fibre 410 and also eliminates any radiation out of a spectral band of a few nanometre wide, centred to the laser wavelength. The fibred Bragg mirror 412 eliminates in particular the Raman radiation resulting from the propagation in the fibre 410 before reflection on this Bragg mirror. On the other hand, it reflects the pulse that has been spectrally broadened by the self-phase modulation undergone during the propagation in the fibre 410 before reflection on this Bragg mirror without reducing the spectral width of the pulse. This alternative makes it possible to accumulate desired effects of spectral broadening by self-phase modulation without undergoing the associated deleterious effects such as Raman effect. Moreover, it makes it possible to divide by two the length of the optical fibre 410 used. The rest of the amplification and compression chain is similar to that described in connection with FIG. 3.

An example of use of an optical-fibre laser system as described in connection with FIGS. 1 to 4 is described in detail hereinafter.

The laser oscillator 200 generates initial pulses 1 having a duration of 50 ps at the rate of 20 MHz. A fixed-gain source optical pre-amplifier 220 amplifies the energy of the pre-amplified pulses up to 2 nJ. A fibred acousto-optic modulator 270 is used to reduce the rate to 250 kHz and to adjust the energy of the source pulses 10 in a window between 0.2 nJ and 0.8 nJ.

The source pulses 10 are injected into a spectro-temporal shaping module 110 consisted of a single-mode fibre of 400 m length, then into an optical amplifier system (as illustrated in FIG. 3). The total optical fibre length of the optical amplifier system is 10 m, with 2 m of active fibres. The pulses are amplified up to an energy of 16 μJ at the output of the optical amplifier system, then recompressed in the dispersive volume Bragg grating compressor 170.

FIG. 5A shows an example of spectrum for a spectrally broadened pulse 11 at the output of the spectro-temporal shaping module 110. The spectrum is here calculated by a simulation code using the input data of the experience, in particular for a module input energy of 0.2 nJ. The spectral width at the output of the module 110 is of 0.29 nm. FIG. 5B shows the calculated spectrum of the compressed pulse 17 at the output of the compressor 170. The typical modulations of a spectral broadening by self-phase modulation can be found in this image. The spectral width is then of 2.43 nm. FIG. 6 shows the autocorrelation function of the compressed pulse measured at the system output (curve 600) and, respectively, of the spectrally broadened pulse calculated with our code (curve 610). The pulse duration is of 1.2 ps.

The optimum compression expressed as giving the compressed pulse 17 of shortest duration is obtained by adjusting the diffraction efficiency of the acousto-optic modulator 270 of an injector 100 as described in connection with FIG. 2B, which allows adjusting the energy of the source pulse 10 injected into the spectro-temporal shaping module 110.

The duration of the compressed pulses 17 can also be tuned by modifying the diffraction efficiency of the acousto-optic modulator 270, which makes it possible to adjust the energy of the source pulse 10 injected into the spectro-temporal shaping module 110.

FIG. 7 shows a calculated example of duration D of compressed pulse 17 as a function of the energy of the source pulse 10 injected into the spectro-temporal shaping module 110. Adjusting the source pulse 10 energy between 0.2 nJ and 0.25 nJ, i.e. a variation of 25%, makes is possible to accurately adjust the compressed pulse duration between about 2.5 ps and 1 ps (a variation of more than 150%).

It is observed that the source pulse 10 energy adjustment may be obtained in an equivalent manner by modifying the gain of the source optical pre-amplifier 220 in the injector 100, as described in connection with FIG. 2A.

Figure 8B:
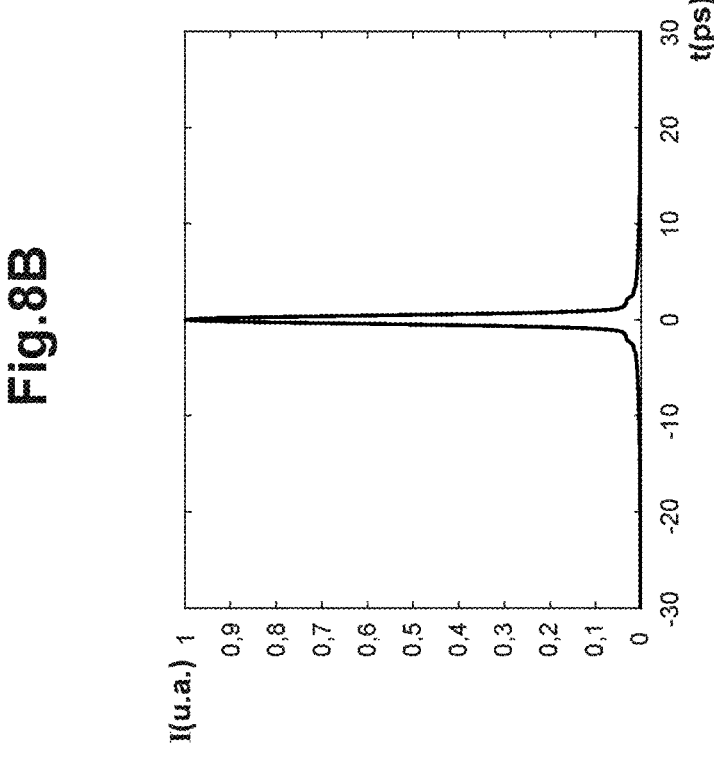
FIG. 8B shows an autocorrelation trace of the compressed pulse of 0.76 ps duration formed from the amplified pulse illustrated in FIG. 8A.
Figure 8A:
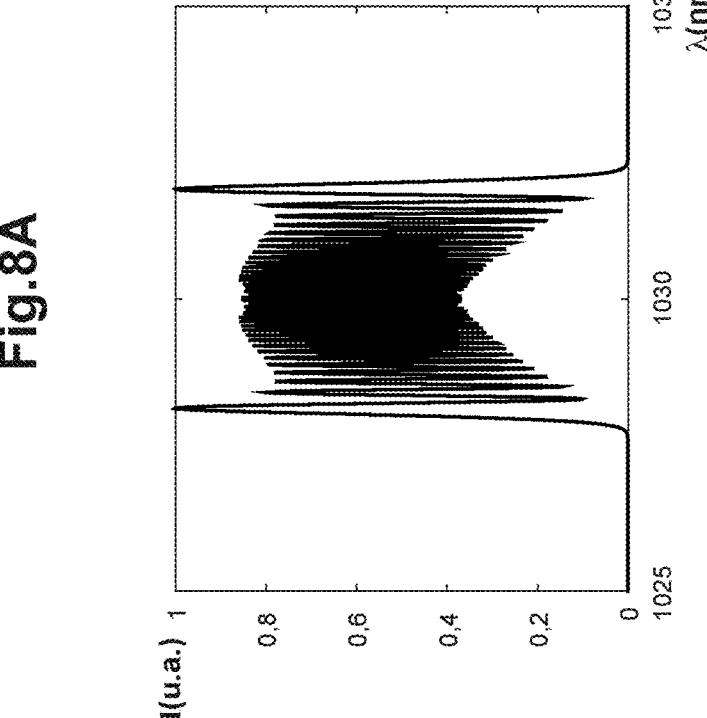
FIG. 8A illustrates an exemplary of spectral shape of an amplified pulse at the output of the last optical amplifier (of an initial pulse of 50 ms duration and 0.8 nJ initial energy), the spectral width being of 3.8 nm.

In an exemplary embodiment, the energy of the source pulse 10 injected into the spectro-temporal shaping module 110 is increased up to 0.8 nJ, producing, at the output of this module, a spectrum of 0.87 nm width. The gain of the source optical pre-amplifier 220 is reduced to keep the same incident energy on the last optical amplifier 150 and the gain of this last optical amplifier 150 is adjusted to optimize the compression. FIGS. 8A-8B show the spectrum (FIG. 8A) and the autocorrelation function (FIG. 8B) of the compressed pulse 17. The spectrum of FIG. 8A is significantly broadened (bandwidth ~3.8 nm) and his shape is different than that of FIG. 5B. It remains highly modulated but the extreme frequency peaks of FIG. 5B are greatly reduced in favour of the centre frequencies that correspond to these areas in which the chirp is linear and hence easily compensable by the compressor. The autocorrelation function corresponds to a significantly shorter pulse duration of about 0.76 ps, with an extremely reduced pedestal with respect to FIGS. 5A and 5B, respectively. It is also observed here that the choice of the spectro-temporal shaping module 110 use parameters has an influence on the quality and shape of the compressed pulse 17. The energy adjustment of the source pulse 10 at the input of the spectro-temporal shaping module effectively allows adjusting very accurately the duration of the compressed pulse 17.

Figure 9:
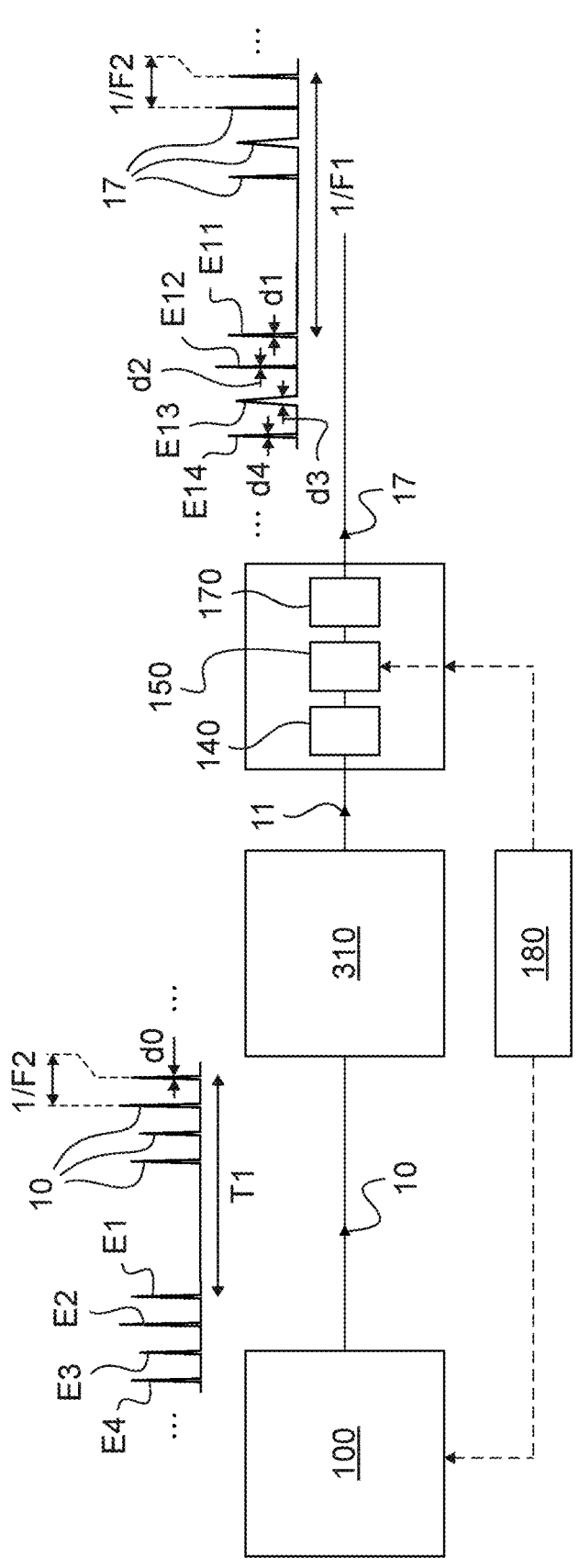
FIG. 9 shows an example of laser system configured to generate a pulse train, the duration of each pulse of the train being modulated independently of each other.

In a particular embodiment shown in FIG. 9, the injector 100 produces a train of packets of source pulses having a variable amplitude or energy E1, E2, E3, E4, the energy of each source pulse 10 being chosen by the user. At the output of the injector 10, the source beam consists for example, and without limitation to this example, of a periodic train at the rate F1 of packets of pulses at the rate F2, each pulse of a packet having a variable and not necessarily constant energy E1, E2, E3, E4. This train of energy-modulated pulses produces after passage in the spectro-temporal shaping module 110 and the whole amplifying chain and the compressor 170, a train of compressed pulses 17 of duration D1, D2, D3, D4 variable as a function of the energy modulation of the source pulses imposed by the injector 100. Moreover, each compressed pulse 17 has an energy E11, E12, E13, E14 that is variable as a function of the energy of the source pulses E1, E2, E3, E4, respectively.

FIG. 9 schematically shows an example of laser system for the production of a train of duration-modulated pulses according to the present disclosure.

The energy adjustment of an incident pulse in the last amplifier 150 modifies the quantity of self-phase modulation induced in this last amplifier 150. In order to keep minimal the compressed duration, it is then advisable to adjust the amplification factor of the last amplifier, which allows adjusting the energy of the compressed pulse 17 at the compressor output. Thus, the present disclosure proposes a method for slightly modifying the energy of the compressed pulse 17 while keeping the minimum duration allowed by the phase and amplitude characteristics of the amplified pulse, for example by modifying the gain of the first optical amplifier 130, for example by reducing this gain and compensating for this variation by modifying the gain of the last optical amplifier 150, herein by increasing it. The self-phase modulation being not created exactly at the same level in the amplification chain, it may be theoretically shown and experimentally observed that the final energy giving the optimum compression is obtained for a greater energy when the gain of the pre-amplifier is reduced and that of the final amplifier increased.

In order to allow an easy use of the invention, the final segment consisted of a passive fibre 360 and of the last fibre amplifier 150 is inserted into a soft cladding 160. The cladding 160 is made of a metal or a polymer or an association of materials suitable for providing protection against impacts and tractions on the fibres. This cladding has a typical diameter of 1 to 9 mm and a minimum bending radius lower than 50 cm. Preferably, the diameter of the gain 160 is less than 6 mm and the minimum bending radius is less than 10 cm. The cladding 160 is solidly hitched, on one side, to the body 1001 of the laser (comprising the injector 100, the spectro-temporal shaping module 110 and possibly one or several other amplification and spectral filtering stages), and, on the other side, to the mechanical body 190 supporting the compressor 17. The optical fibres can freely move inside the cladding 160 including the weld between the passive fibre 360 and active fibre 150 section. The distal end of the last optical amplifier 150 is attached to the mechanical body surrounding the compressor 17 (see FIG. 10 for example).

The system described here is usable in many applications that require ultra-short and intense laser pulses. In particular, all the micro-machining applications benefit from the flexibility due to the softness of the last amplifier optical fibre for delivering the laser beam at any point of a scene and under any incidence while keeping the ability to focus at the diffraction limit pulses of less than 3 ps duration.

Figure 10:
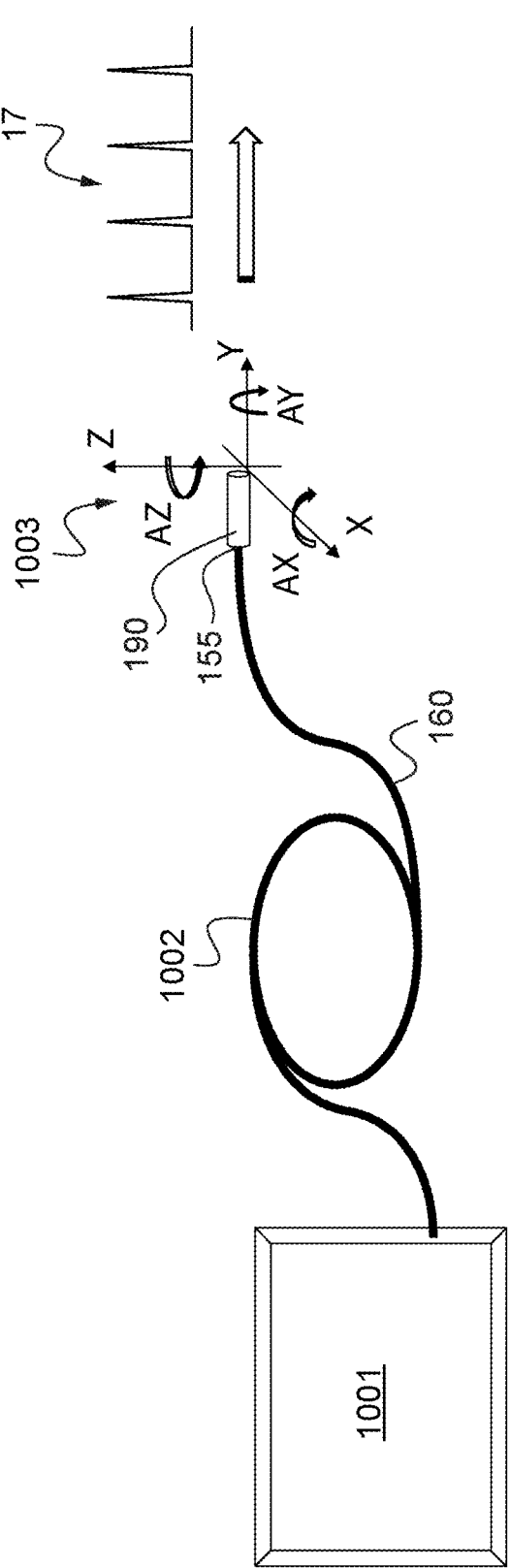
FIG. 10 schematically shows an optical-fibre laser system in which most of the optical-fibre components are arranged inside a flexible mechanical cladding.

For example, an industrial robot may be equipped with the laser system of the present disclosure. The injector 100, the spectro-temporal shaping module 110, the possible pre-amplifiers and pump coupler 351, as well as the pump laser diodes and all the power supply and control electronic boards are included in a source casing 1001 as illustrated in FIG. 10. An active transport module 1002 includes a passive fibre section 360 a short active fibre section forming the last optical amplifier 150 in a soft mechanical cladding 160 solidly attached on one side to the source casing 1001 and on the other side to the compression module 1003. The active transport module 1001 has a minimum bending radius in any direction of 10 cm, possibly 3 cm. The compression module 1003 comprises the compressor 17 and its mechanical support body 190. The compression module 1003 makes it possible to compress the duration of a source pulse 10 that is typically between 30 and 100 ps to a duration of compressed pulse 17 that is less than 3 ps. The compression module 1003 is for example attached to the end of an arm of the robot that is used to move it in all the positions and directions around the piece to be worked. The quality of the beam from the compressor being limited by diffraction, a focus spot diameter of less than 5 μm is obtained on a field of more than 1 m² and at a variable work distance liable to reach more than 1 m while keeping a focal spot of less than 100 μm diameter.

The invention finds applications in the micro-machining of flat screens or solar cell panels of several metre side, without having to move the panel or the screen with respect to the laser, the only moving part being the fibred end connected to the compressor.

The invention is particularly suitable for manufacturing great-size industrial moulds with micro-structures.

Finally, this laser system makes it possible to design medical devices for tissue ablation, such as for example cap cutting in myopia correction surgery, laser-assisted cataract surgery, skin tattoo removal, or any other medical or dermatological treatment device using short pulses. In particular, it is possible to design a hand-piece, held by the surgeon that focuses pulses of less than 3 ps duration on spots of less than 5 μm, regardless of the surgeon's hand movements.

The use of this laser system is obviously not limited to the above-mentioned examples.

Of course, various other modifications may be made to the invention within the scope of the appended claims.

The invention claimed is:

1. An optical-fibre laser system comprising an injector suitable for generating at least one source pulse of duration between 30 and 100 picoseconds and having a source spectral bandwidth, a spectro-temporal shaping module arranged at the output of the injector, the spectro-temporal shaping module comprising a passive single-mode optical fibre having a length between 100 metres and 1 kilometre, the passive single-mode optical fibre having a physical length in metres that is between 6 and 12 times the duration of the source pulse in picoseconds, the spectro-temporal shaping module being configured to receive the source pulse and to generate a spectrally broadened pulse having a spectral bandwidth 5 to 50 times broader than the source spectral bandwidth and a duration of less than 1.5 times the source pulse duration, an optical amplifier system with flexible single-mode optical-fibre, the optical amplifier system having a flexible optical fibre length longer than one metre, the optical amplifier system comprising at least one last optical fibre amplifier, the last amplifier having a length of less than ten metres, at least one last spectral filter arranged downstream from the spectro-temporal shaping module and upstream from the last optical fibre amplifier, the last spectral filter having a spectral bandwidth of less than 50 nm and higher than or equal to the spectral bandwidth of the spectrally broadened light pulse, in such a way as to limit the generation of a Raman signal in the last optical-fibre amplifier, the last amplifier being suitable for receiving a filtered pulse from the spectral filter and for generating a controlled chirped amplified pulse at one end of the last amplifier, the end of the last optical-fibre amplifier being flexible about at least two axes of rotation transverse to the optical axis, with a minimum bending radius of less than 50 cm, the amplified pulse having an energy of more than 1 microjoule, a volume compressor attached to the end of the last optical-fibre amplifier, the compressor having a predetermined almost-linear chirp, the compressor being suitable for receiving the amplified pulse and forming a compressed pulse of less than 3 picoseconds duration, and electronic means for adjusting the compressed pulse duration, said electronic duration adjustment means being consisted of energy adjustment means suitable for adjusting the energy of the source pulse and/or of the amplified pulse, the duration of the compressed pulse being tunable based on the energy setting.

2. The fibre laser system according to claim 1, wherein the injector further includes a pulse selector or an optical attenuator or an electro-optic modulator or an acousto-optic modulator or any combination of these elements and wherein the energy adjustment means are suitable for adjusting the energy of the source pulse by means of the pulse selector, the optical attenuator, the electro-optic modulator or the acousto-optic modulator, respectively, or the combination thereof.

3. The laser system according to claim 1, wherein the electronic means for adjusting the duration of the compressed pulse comprise means for adjusting the energy of the optical amplifier system.

4. The laser system according to claim 3, wherein the optical amplifier system comprises at least one pump diode suitable for generating a pump radiation and wherein the means for adjusting the energy of the optical amplifier system are suitable for adjusting an electrical current of the pump diode in such a way as to adjust the pump radiation injected into the optical amplifier system.

5. The fibre laser system according to claim 1, wherein the optical amplifier system is based on step-index optical fibre and/or photonic-crystal-structure optical fibre having a solid core and a guiding cladding formed of capillaries arranged in a ring around the core.

6. The fibre laser system according to claim 1, wherein the optical amplifier system includes a double-cladding optical fibre.

7. The fibre laser system according to claim 1, wherein the amplifier system includes a last passive single-mode optical fibre arranged upstream from the last flexible optical-fibre amplifier.

8. The fibre laser system according to claim 1, wherein the last amplifier has a length of less than one metre or two metres.

9. The fibre laser system according to claim 1, wherein the amplifier system includes a first flexible optical-fibre amplifier arranged upstream from the last amplifier and a first spectral filter arranged downstream from the spectro-temporal shaping module and upstream from the first amplifier.

10. The fibre laser system according to claim 1, wherein the last amplifier and/or the first amplifier includes an optical fibre having a core based on silica doped with rare earth ions, chosen among the following ions: ytterbium, neodymium, erbium-ytterbium, holmium, thulium, ytterbium-thulium.

11. The fibre laser system according to claim 1, wherein the compressor includes two fixed-pitch gratings or a dispersive volume Bragg grating with continuously variable pitch.

12. The fibre laser system according to claim 1, comprising a flexible protective mechanical cladding arranged around the last amplifier and the passive fibre and mechanically attached to the compressor.

13. The fibre laser system according to claim 1, wherein the energy adjustment means are suitable for adjusting the energy of each source pulse individually in order to vary the compressed duration of each individually amplified pulse.

14. The fibre laser system according to claim 1, wherein the duration of the compressed pulse decreases as a function of the increasing energy of the source pulse in a variation range of ±40% of the source pulse energy.

15. A micro-machining device, a medical device, an ophthalmic surgery device or a skin tattoo removal device comprising the optical fiber laser system of claim 1.

16. The laser system according to claim 2, wherein the electronic means for adjusting the duration of the compressed pulse comprise means for adjusting the energy of the optical amplifier system.

17. The laser system according to claim 16, wherein the optical amplifier system comprises at least one pump diode suitable for generating a pump radiation and wherein the means for adjusting the energy of the optical amplifier system are suitable for adjusting an electrical current of the pump diode in such a way as to adjust the pump radiation injected into the optical amplifier system.

18. The fibre laser system according to claim 2, wherein the optical amplifier system is based on step-index optical fibre and/or photonic-crystal-structure optical fibre having a solid core and a guiding cladding formed of capillaries arranged in a ring around the core.

19. The fibre laser system according to claim 3, wherein the optical amplifier system is based on step-index optical fibre and/or photonic-crystal-structure optical fibre having a solid core and a guiding cladding formed of capillaries arranged in a ring around the core.

20. The fibre laser system according to claim 4, wherein the optical amplifier system is based on step-index optical fibre and/or photonic-crystal-structure optical fibre having a solid core and a guiding cladding formed of capillaries arranged in a ring around the core.

* * * * *